Patented May 7, 1940

2,199,979

UNITED STATES PATENT OFFICE 2,199,979

PROCESS OF VULCANIZING RUBBER

David J. Beaver, Nitro, W. Va., assignor to Monsanto Chemical Company, St. Louis, Mo., a corporation of Delaware No Drawing. Application May 7, 1937
Serial No. 141,353

15 Claims. (Cl. 260—782)

The present invention relates to the vulcanization of rubber by an improved process wherein there is employed a preferred class of compounds which improve the action of the accelerator employed in the vulcanization process.

Many accelerators, which are particularly strong in their accelerating action and are otherwise desirable, cannot effectively be employed commercially in certain processes for the reason that such stocks into which they are incorporated tend to "scorch" or prevulcanize during the milling operation or on storage of the compounded stock. As typical examples of accelerators which exhibit this undesirable property in varying degrees are the dithiocarbamates, the thiuram disulfides and mercaptothiazoles. Again certain of the accelerators known as aldehyde-amine accelerators, for example butyl aldehyde aniline accelerators, are also "scorchy" when employed as a vulcanization accelerator in rubber stocks.

In accordance with the present invention it has been found that the "scorching" properties of rubber vulcanization organic accelerators may generally be greatly reduced and in many cases eliminated by employing in conjunction therewith a phenanthridyl substituted organic acid. Preferably the compounds of the present invention comprise a class of compounds wherein a phenanthridyl radical and a carboxyl radical are attached to adjacent carbon atoms of an aliphatic or arylene radical.

As typical examples of the preferred compounds of the present invention are o-(9-phenanthridyl)-benzoic acid, beta-(9-phenanthridyl) propionic acid, beta-(9-phenanthridyl) acrylic acid and 1-carboxylic-2-(9-phenanthridyl)-3-isopropyl-6-methyl-3-6-endoethylene-delta-4-tetrahydrobenzene.

In accordance with the present invention it has also been found that certain metallic salts of the above mentioned compounds may be employed to good advantage with vulcanization accelerators. Thus, for example, the cadmium, magnesium, lead and zinc salts may be employed. Furthermore, the amine salts, and in particular the guanidine salts, of the above mentioned acids may be employed.

In general the specific substances of the present invention may be assigned the formula of

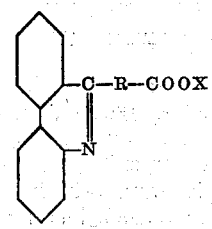

—C—R—COOX where R is an aliphatic or arylene radical and X is hydrogen, cadmium, magnesium, lead or zinc or with an amine and preferably a guanidine forms a substituted ammonium radical. These compounds are obtainable by heating an ortho amino biphenyl with an acid anhydride to a suitable temperature to form the imide, and further heating in the presence of anhydrous zinc chloride according to the method of Koelsch, Journal American Chemical Society, vol. 58, page 1325 (1936).

EXAMPLE I

As a specific embodiment of the invention substantially equi-molecular proportions of o-amino-biphenyl and phthalic anhydride were heated to substantially 200° C. The crude product so formed was purified by dissolving in acetone and precipitating by the addition of water to the acetone solution. To 110 parts by weight of the o-biphenyl phthalimide so formed 220 parts by weight of zinc chloride were added and the mixture heated to substantially 270° C. with agitation. The crude product so formed was purified by dissolving in dilute aqueous caustic soda solution, filtering and precipitating with dilute hydrochloric acid, again filtering and drying the precipitate. The reactions involved follow:

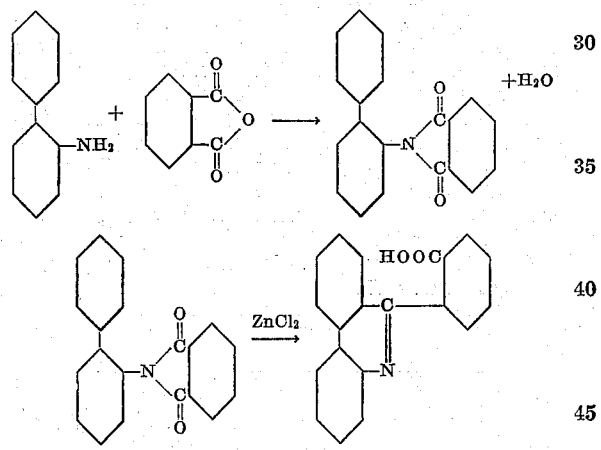

The product obtained as defined above was incorporated in a rubber stock comprising

|  | Stock A | Stock B |
|---|---|---|
|  | Parts by weight | Parts by weight |
| Pale crepe rubber | 100 | 100 |
| Zinc oxide | 5 | 5 |
| Sulfur | 2 | 2 |
| Whiting | 60 | 60 |
| Laurex | 0.25 | 0.25 |
| Di-(benzothiazyl-thiol)-dimethyl urea | 0.60 | 0.60 |
| Diphenyl guanidine phthalate | 0.90 | 0.90 |
| o-(9-phenanthridyl) benzoic acid |  | 0.50 |

The stocks so compounded were vulcanized by heating in a press in the well known manner for varying periods of time at the temperature of 20 pounds of steam pressure per square inch. On testing the cured rubber product, the following results were obtained.

*Table I*

| Stock | Cure time, mins. | Modulus of elasticity in lbs./in.² at elongations of — | | Tensile at break in lbs./in.² | Ult. elong., percent |
|---|---|---|---|---|---|
| | | 400% | 600% | | |
| A | 30 | 1075 | 2985 | 3590 | 660 |
| B | 30 | 1043 | 2710 | 3460 | 670 |
| A | 45 | 1180 | 3150 | 3710 | 650 |
| B | 45 | 1115 | 3005 | 3460 | 645 |
| A | 60 | 1140 | 3180 | 3620 | 645 |
| B | 60 | 1170 | 3075 | 3440 | 635 |

In order to demonstrate the anti-scorching properties of the new class of compounds, plasticity data were obtained on the uncured rubber stocks using the Williams plastometer, described by Williams, Industrial and Engineering Chemistry, vol. 16, page 362 (1924)—see also Krall, ibid, vol. 16, page 922 (1924). A brief description of the method employed in determining the plasticity figures set forth below follows. Cylinders of two cubic centimeters in volume are cut from uncured rubber compounded stock and placed in a constant temperature oven for the times and at the temperature indicated. After this initial heating, called "preheating", the test pieces of the uncured stock are placed in the Williams plastometer, which is in reality a plastometer press, having a movable upper weighted plate connected to a gauge graduated in 1/100 millimeters so as to measure the distance between the upper and lower plates of the press. The plastometer is maintained in a constant temperature oven held at 70° C. During the plasticity test the preheated test piece remains in the plastometer with the upper movable plate resting on it for exactly 3 minutes, at the end of which period, the reading on the gauge is taken, which reading is called the plasticity figure. This figure is in reality the height of the rubber test cylinder in 1/100 millimeters after the upper movable plate of the press has rested on it for the period of 3 minutes designated. The lower figures represent less vulcanization or "set up" and in consequence indicate a less scorchy stock. The plasticity data follow in Table II.

*Table II*

| Stock | Preheating time in minutes at 200° F. | Plasticity figure |
|---|---|---|
| A | 180 | 542 |
| B | 180 | 228 |
| A | 240 | 630 |
| B | 240 | 352 |

An examination of the above data set forth in Table II shows the remarkable anti-scorching effect of the preferred materials of the present invention, for example o-(9-phenanthridyl) benzoic acid, when employed with thiazole accelerators.

As a further specific embodiment of the present invention maleic anhydride and o-amino biphenyl were reacted in a manner analogous to that indicated in Example I. The product so obtained, which is believed to possess the structural formula of

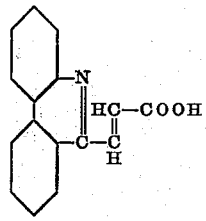

and which may be called beta-9(-phenanthridyl) acrylic acid, was incorporated in a rubber stock comprising

| | Stock C | Stock D |
|---|---|---|
| | Parts by weight | Parts by weight |
| Pale crepe rubber | 100 | 100 |
| Zinc oxide | 5 | 5 |
| Whiting | 60 | 60 |
| Sulfur | 2 | 2 |
| Laurex | 0.25 | 0.25 |
| Di-(benzothiazyl-thiol)-dimethyl urea | 0.6 | 0.6 |
| Diphenyl guanidine phthalate | 0.9 | 0.9 |
| Beta-9 (-phenanthridyl) acrylic acid | | 0.25 |

The stocks so compounded were vulcanized by heating in a press in the well-known manner for different times at the temperature of 20 pounds of steam pressure per square inch. On testing the cured rubber product, the following data were obtained.

*Table III*

| Stock | Cure time, mins. | Modulus of elasticity in lbs./in.² at elongations of— | | Tensile at break in lbs./in.² | Ult. elong., percent |
|---|---|---|---|---|---|
| | | 300% | 500% | | |
| C | 30 | 565 | 1,750 | 3,505 | 635 |
| D | 30 | 525 | 1,650 | 3,480 | 650 |
| C | 45 | 555 | 1,800 | 3,350 | 625 |
| D | 45 | 580 | 1,825 | 3,480 | 625 |
| C | 60 | 595 | 1,865 | 3,600 | 620 |
| D | 60 | 595 | 1,840 | 3,600 | 625 |

Plastometer tests carried out in the Williams plastometer as described above on the uncured rubber stocks gave the following data as set forth in Table IV.

*Table IV*

| Stock | Preheating time in minutes @ 200° F. | Plasticity figure |
|---|---|---|
| C | 180 | 427 |
| D | 180 | 222 |
| C | 240 | 672 |
| D | 240 | 360 |

EXAMPLE III 1-carboxylic-2-(9-phenanthridyl)-3-isopropyl-6-methyl-3-6-endo-ethylene-delta-4-tetrahydrobenzene was prepared by reacting 3-isopropyl-6-methyl-3,6-endoethylene delta-4-tetrahydro phthalic anhydride and o-amino biphenyl in a manner analogous to that given under Example I.

The product obtained as described and believed to possess the structure of

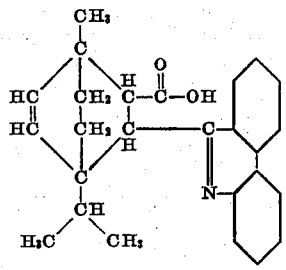

was compounded in a rubber stock comprising

|  | Stock E | Stock F |
| --- | --- | --- |
|  | Parts by weight | Parts by weight |
| Pale crepe rubber | 100 | 100 |
| Zinc oxide | 5 | 5 |
| Whiting | 60 | 60 |
| Sulfur | 2 | 2 |
| Laurex | 0.25 | 0.25 |
| Di-(benzothiazyl-thiol)-dimethyl urea | 0.60 | 0.60 |
| Diphenyl guanidine phthalate | 0.9 | 0.9 |
| Example III |  | 0.25 |

The stocks so compounded were vulcanized in a press at the temperature of 20 pounds of steam pressure per square inch, and the vulcanized rubber product on testing gave the following results.

Table V

| Stock | Cure time, mins. | Modulus of elasticity in lbs./in.² at elongations of— | | Tensile at break in lbs./in.² | Ult. elong., percent |
| --- | --- | --- | --- | --- | --- |
|  |  | 300% | 500% |  |  |
| E | 30 | 565 | 1,750 | 3,505 | 635 |
| F | 30 | 540 | 1,700 | 3,260 | 620 |
| E | 45 | 555 | 1,800 | 3,350 | 625 |
| F | 45 | 575 | 1,805 | 3,475 | 630 |
| E | 60 | 595 | 1,865 | 3,600 | 620 |
| F | 60 | 575 | 1,835 | 3,335 | 620 |

Plastometer tests carried out in the Williams plastometer as described above on the uncured rubber stocks gave the following plasticity figures.

Table VI

| Stock | Preheating time in minutes @ 200° F. | Plasticity figure |
| --- | --- | --- |
| E | 180 | 427 |
| F | 180 | 208 |
| E | 240 | 672 |
| F | 240 | 580 |

EXAMPLE IV

As a further specific embodiment of this invention succinic anhydride and o-amino biphenyl were reacted in a manner analogous to that indicated in Example I. The product so obtained, which is believed to possess the formula of

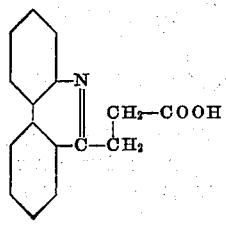

and which may be called beta-9-(phenanthridyl) propionic acid, was also incorporated into and employed in a typical mercaptothiazole accelerated rubber stock in accordance with the present invention.

As further specific embodiments showing the use of the preferred class of compounds in conjunction with various accelerators, rubber stocks were compounded comprising

| | Parts by weight | | | | | |
| --- | --- | --- | --- | --- | --- | --- |
|  | G | H | I | J | K | L |
| Smoked sheet rubber | 100 | 100 | 100 | 100 | 100 | 100 |
| Zinc oxide | 5 | 5 | 5 | 5 | 5 | 5 |
| Whiting | 60 | 60 | 60 | 60 | 60 | 60 |
| Sulfur | 2 | 2 | 2 | 2 | 2 | 2 |
| Laurex | 0.25 | 0.25 | 0.25 | 0.25 | 0.25 | 0.25 |
| Mercaptobenzothiazole | 2 | 2 |  |  |  |  |
| Benzothiazylthiobenzoate |  |  | 2 | 2 |  |  |
| Butylaldehyde-aniline condensation product |  |  |  |  | 1.25 | 1.25 |
| o-(9-phenanthridyl)-benzoic acid |  | 0.5 |  | 0.5 |  | 0.5 |

The compounded stocks were vulcanized by heating in a press for varying periods of time at the temperature of 20 pounds of steam pressure per square inch. On testing the cured rubber stocks, the data given in Table VII were obtained.

Table VII

| Stock | Cure time, mins. | Modulus of elasticity in lbs./in.² at elongations of— | | | Tensile at break in lbs./in.² | Ult. elong., percent |
| --- | --- | --- | --- | --- | --- | --- |
|  |  | 300% | 500% | 700% |  |  |
| G | 30 | 376 | 1060 | 2710 | 2710 | 700 |
| H | 30 | 388 | 1060 | 2740 | 2740 | 700 |
| G | 45 | 381 | 1000 | 2670 | 2670 | 700 |
| H | 45 | 401 | 1025 | 2720 | 2720 | 700 |
| I | 45 | 361 | 1005 | 2605 | 2605 | 700 |
| J | 45 | 333 | 975 |  | 2495 | 695 |
| I | 60 | 366 | 1010 | 2605 | 2605 | 700 |
| J | 60 | 353 | 1010 |  | 2490 | 675 |
| K | 60 | 550 | 1750 |  | 3085 | 630 |
| L | 60 | 513 | 1585 |  | 3135 | 645 |

Plastometer tests were carried out in the Williams plastometer on the uncured rubber stocks and the following plastometer readings obtained.

Table VIII

| Stock | Preheating time in minutes @ 200 °F. | Plasticity figure |
| --- | --- | --- |
| G | 120 | 537 |
| H | 120 | 322 |
| I | 300 | 452 |
| J | 300 | 390 |
| K | 120 | 415 |
| L | 120 | 281 |

An examination of the data hereinbefore set forth shows that the preferred class of materials have surprisingly little effect on the vulcanization of compounded rubber stocks at normal vulcanization temperatures, but possess exceptional properties in preventing a "set up" or prevulcanization at temperatures below that usually employed in the vulcanization step.

The preferred class of compounds of the present invention may be employed in other types of stocks than those specifically shown above.

Thus, for example 0.10 part by weight of o-(9-phenanthridyl)-benzoic acid was incorporated in a rubber gum stock comprising

| | Parts by weight |
|---|---|
| Pale crepe rubber | 100 |
| Zinc oxide | 5 |
| Sulfur | 3 |
| Stearic acid | 1 |
| Di-(benzothiazyl-thiol)-dimethyl urea | 0.6 |

Plasticity tests carried out on the unvulcanized rubber stock exhibited the anti-scorching properties thereof typical of the preferred class of compounds.

This invention is not restricted to the use of the particular compounds given in the disclosure as specific examples, nor is it restricted to the use of the preferred class of compounds in the particular rubber mixes hereinbefore described. The invention is limited solely by the claims attached hereto as part of the present specification.

What is claimed is:

1. The process of vulcanizing rubber which comprises heating rubber and sulfur in the presence of a phenanthridyl substituted mono carboxylic acid containing a free carboxyl group and a phenanthridyl group substituted for a non-acid hydrogen atom wherein said substitution is effected in the 9 position of the phenanthridyl radical and in addition thereto a thiazole accelerator.

2. The process of vulcanizing rubber which comprises heating rubber and sulfur in the presence of an organic mono carboxylic acid containing a 9 phenanthridyl group attached to a carbon atom adjacent to the carbon atom to which the said carboxylic radical is attached and in addition thereto a mercapto-benzo-thiazole accelerator.

3. The process of vulcanizing rubber which comprises heating rubber and sulfur in the presence of phenanthridyl benzoic acid of the formula

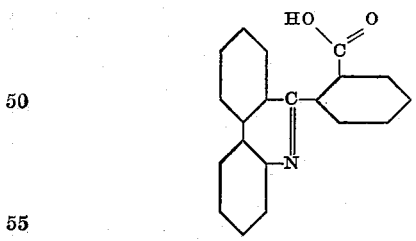

and in addition thereto a mercapto-benzo-thiazole accelerator.

4. The process of vulcanizing rubber which comprises heating rubber and sulfur in the presence of phenanthridyl acrylic acid of the formula

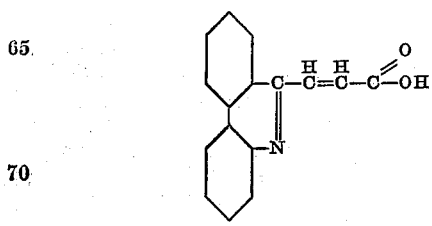

and in addition thereto a mercapto-benzo-thiazole accelerator.

5. The process of vulcanizing rubber which comprises heating rubber and sulfur in the presence of 1-carboxylic-2-(9-phenanthridyl)-3-isopropyl-6-methyl-3-6-endo-ethylene-delta-4-tetra-hydrobenzene of the formula

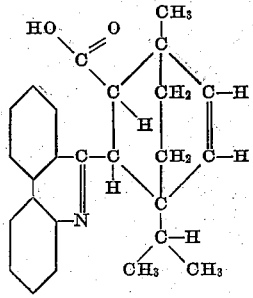

and in addition thereto a mercapto-benzo-thiazole accelerator.

6. A rubber composition containing a 9-phenanthridyl substituted hydrocarbon containing in addition a carboxyl substituent attached to said hydrocarbon and an organic rubber vulcanization accelerator selected from a group consisting of dithio carbamates, thiuram sulfides, mercapto-thiazoles and aldehyde-amines.

7. A rubber composition comprising rubber, sulfur, a phenanthridyl substituted mono carboxylic acid containing a free carboxyl group and a phenanthridyl group substituted for a non-acid hydrogen atom wherein said substitution is effected in the 9 position of the phenanthridyl radical and a thiazole accelerator.

8. A rubber composition comprising rubber, sulfur, an organic mono carboxylic acid containing a 9-phenanthridyl group attached to a carbon atom adjacent to the carbon atom to which the said carboxylic radical is attached and a mercapto-benzo-thiazole accelerator.

9. A rubber composition comprising rubber, sulfur, phenanthridyl benzoic acid of the formula

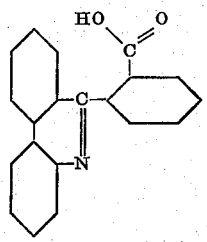

and a mercapto-benzo-thiazole accelerator.

10. A rubber composition comprising rubber, sulfur, phenanthridyl acrylic acid of the formula

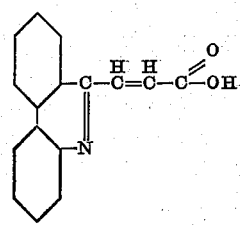

and a mercapto-benzo-thiazole accelerator.

11. A rubber composition comprising rubber, sulfur, 1-carboxylic-2-(9-phenanthridyl)-3-isopropyl-6-methyl-3-6 endo-ethylene-delta-4-tetrahydrobenzene of the formula

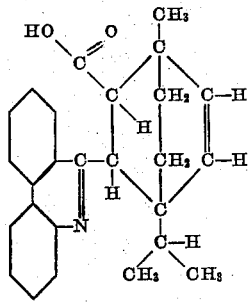

and a mercapto-benzo-thiazole accelerator.

12. The process of vulcanizing rubber which comprises heating rubber and sulfur in the presence of a compound possessing the structure of

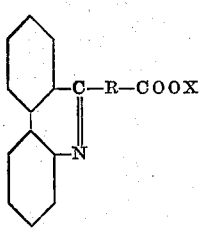

where R is a radical selected from a group consisting of aliphatic hydrocarbons and arylenes and X is selected from a group consisting of hydrogen, cadmium, magnesium, lead, zinc and substituted ammonium radicals and in addition thereto an organic rubber vulcanization accelerator selected from a group consisting of dithiocarbamates, thiuram sulfides, mercaptothiazoles and aldehyde-amines.

13. The process of vulcanizing rubber which comprises heating rubber and sulfur in the presence of a compound possessing the structure of

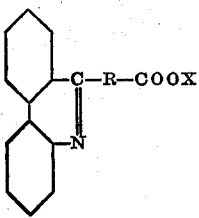

where R is a radical selected from a group consisting of aliphatic hydrocarbons and arylenes and X is selected from a group consisting of hydrogen, cadmium, magnesium, lead, zinc and substituted ammonium radicals and in addition thereto to mercapto-benzo-thiazole accelerator.

14. A rubber composition comprising rubber, sulfur, a compound possessing the structure of

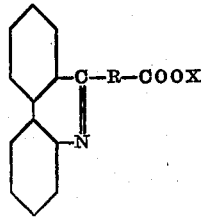

where R is a radical selected from a group consisting of aliphatic hydrocarbons and arylenes and X is selected from a group consisting of hydrogen, cadmium, magnesium, lead, zinc and substituted ammonium radicals and in addition thereto an organic rubber vulcanization accelerator selected from a group consisting of dithiocarbamates, thiuram sulfides, mercaptothiazoles and aldehyde-amines.

15. A rubber composition comprising rubber, sulfur, a compound possessing the structure of

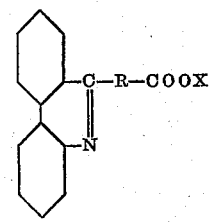

where R is a radical selected from a group consisting of aliphatic hydrocarbons and arylenes and X is selected from a group consisting of hydrogen, cadmium, magnesium, lead, zinc and substituted ammonium radicals and in addition thereto a mercapto-benzo-thiazole accelerator.

DAVID J. BEAVER.